(12) United States Patent
Duvall et al.

(10) Patent No.: US 10,119,591 B1
(45) Date of Patent: Nov. 6, 2018

(54) GAS STRUT SPRING ASSISTED WEAR MONITORING SYSTEM

(71) Applicant: GM Global Technology Operations LLC, Detroit, MI (US)

(72) Inventors: Jacob Duvall, Royal Oak, MI (US); Himanshu H. Mehta, Ann Arbor, MI (US); Jason L. Hepner, Davisburg, MI (US); Jason Miller, St. Clair Shores, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/693,831

(22) Filed: Sep. 1, 2017

(51) Int. Cl.
| | | |
|---|---|---|
| *G01G 19/00* | (2006.01) |
| *F16F 9/32* | (2006.01) |
| *G01L 5/00* | (2006.01) |
| *G08B 21/18* | (2006.01) |
| *F16F 9/02* | (2006.01) |
| *E05F 1/10* | (2006.01) |
| *B60Q 5/00* | (2006.01) |
| *B60Q 3/70* | (2017.01) |
| *E05F 3/02* | (2006.01) |

(52) U.S. Cl.
CPC .......... *F16F 9/3292* (2013.01); *G01L 5/0057* (2013.01); *G08B 21/182* (2013.01); *B60Q 3/70* (2017.02); *B60Q 5/005* (2013.01); *E05F 1/1091* (2013.01); *E05F 3/02* (2013.01); *E05Y 2900/532* (2013.01); *F16F 9/0218* (2013.01); *F16F 2230/0047* (2013.01); *F16F 2230/08* (2013.01); *F16F 2230/16* (2013.01); *F16F 2230/24* (2013.01)

(58) Field of Classification Search
CPC ......... B64C 25/60; B64C 25/22; B64C 25/62; G01M 17/04; G01M 1/125; G01M 3/2846; G01M 3/36; B64F 5/60; B64F 5/0045; B64F 5/0081; B64F 5/40; F16M 11/24; F16M 11/18; F16M 11/2014; F16M 2200/027
USPC ....... 340/665, 661, 674, 679, 683, 669, 670, 340/687, 686.5, 691.1, 691.6, 692, 6, 340/693.2, 2.31
See application file for complete search history.

(56) References Cited

U.S. PATENT DOCUMENTS

| | | | | |
|---|---|---|---|---|
| 5,337,976 | A * | 8/1994 | Derrien ................ | B64C 25/14 244/102 A |
| 5,364,201 | A * | 11/1994 | LaBarre ................ | F16C 7/00 16/326 |
| 5,423,393 | A * | 6/1995 | Felt ...................... | B62K 23/00 180/221 |
| 5,664,651 | A * | 9/1997 | Miura .................. | F16F 9/363 188/322.17 |
| 6,027,459 | A * | 2/2000 | Shain ................ | A61B 5/14532 600/573 |

(Continued)

*Primary Examiner* — Daniel Previl
(74) *Attorney, Agent, or Firm* — Cantor Colburn LLP

(57) ABSTRACT

A gas strut active monitoring system for a gas strut includes a gas strut wear monitor connected to a base end of the gas strut and a strut end. The gas strut wear monitor is removable from the gas strut such that the gas strut is replaceable without replacing the gas strut wear monitor. The gas strut wear monitor is configured to monitor an output force of the gas strut, and output a signal indicative of a maintenance recommendation for the gas strut based on the output force.

20 Claims, 4 Drawing Sheets

(56) References Cited

U.S. PATENT DOCUMENTS

| | | | | |
|---|---|---|---|---|
| 6,082,552 A | * | 7/2000 | Pollock | B62H 3/12 |
| | | | | 211/104 |
| 2015/0367933 A1 | * | 12/2015 | Li | B64C 25/62 |
| | | | | 701/3 |
| 2017/0166329 A1 | * | 6/2017 | Fazeli | B64F 5/0045 |

* cited by examiner

GAS STRUT SPRING ASSISTED WEAR MONITORING SYSTEM

The subject disclosure relates to gas struts, and more particularly to gas strut wear monitoring.

Gas struts are known to include a piston assembly that reciprocates within a pressure chamber defined by a housing. Typically, the pressure chamber contains an inert gas, such as nitrogen, that is mechanically compressed to exert force on the piston in the chamber. The piston assembly includes an enlarged head, that slides within the housing, and a rod that extends from the head and out through one end of the housing. In operation, as the rod retracts within the housing, the total volume of the pressure chamber is reduced thus increasing the gas pressure within the chamber. The piston head may include valves or openings that communicate axially through the piston head to control and establish pressure equilibrium on both sides of the piston head regardless of the axial location of the head during a strut cycle. Because the surface area on a leading side of the piston head is larger than a surface area of the other side (i.e., the side that the rod attaches to), axial forces may not be equivalent. Therefore, as pressure increases within the pressure chamber as the strut retracts, a force that resists the retraction increases, tending to bias the strut toward a fully extended position.

Regardless of gas strut position, the positive gas pressure within the gas strut transfers axial forces to the connecting knuckle that attaches the strut to a movable door, fixture, liftgate, etc. Over time, the gas pressure in the pressure chamber may decrease with increasing wear on the strut. For example, a twenty percent decrease in gas pressure may be significant in some applications, and if the degraded pressure condition is known, the decreased pressure may lead to strut maintenance or replacement. Unfortunately, known means to determine degraded gas pressure is limited and/or impractical.

Accordingly, an active strut wear monitoring system for gas struts is desirable.

SUMMARY

In one exemplary embodiment a gas strut active monitoring system for a gas strut includes a gas strut wear monitor connected to a base end of the gas strut and a strut end. The gas strut wear monitor is removable from the gas strut such that the gas strut is replaceable without replacing the gas strut wear monitor. The gas strut wear monitor is configured to monitor an output force of the gas strut, and output a signal indicative of a maintenance recommendation for the gas strut based on the output force.

In another exemplary embodiment, a gas strut wear monitor is described. The gas strut wear monitor is connectable to a base end of a gas strut and a strut end. The gas strut wear monitor is removable from the gas strut such that the gas strut is replaceable without replacing the gas strut wear monitor. The gas strut wear monitor is configured to monitor an output force of the gas strut, and output a signal indicative of a maintenance recommendation for the gas strut based on the output force.

In addition to one or more features describe herein, according to one embodiment the gas strut wear monitor includes an outer housing in communication with the gas strut, an inner housing in communication with the strut end, a spring in communication with the outer housing and the inner housing, a switch configured to determine a proximity of the outer housing with respect to the inner housing, and a switch output device in communication with the switch.

According to another embodiment the gas strut wear monitor is configured to output a signal responsive to the spring forcing the outer housing away from the inner housing.

According to another embodiment the switch comprises a switch body, a power cell, a trigger mechanism in communication with the power cell, and an actuation mechanism in communication with the trigger mechanism.

According to another embodiment the switch is configured to determine the proximity of the outer housing with respect to the inner housing, and output a signal using only the power cell as an independent power source responsive to determining that the outer housing is not proximate to the inner housing.

According to another embodiment the signal is indicative of the maintenance recommendation based on the output force of the gas strut.

According to another embodiment an output force of the spring is linearly correlated to the output force of the gas strut such that the output force of the gas strut is greater than the output force of the spring by a predetermined margin of force.

According to another embodiment an output force of the gas strut that is less than the predetermined margin of force is indicative that the gas strut is operating outside of normal operational parameters.

The above features and advantages, and other features and advantages of the disclosure, are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
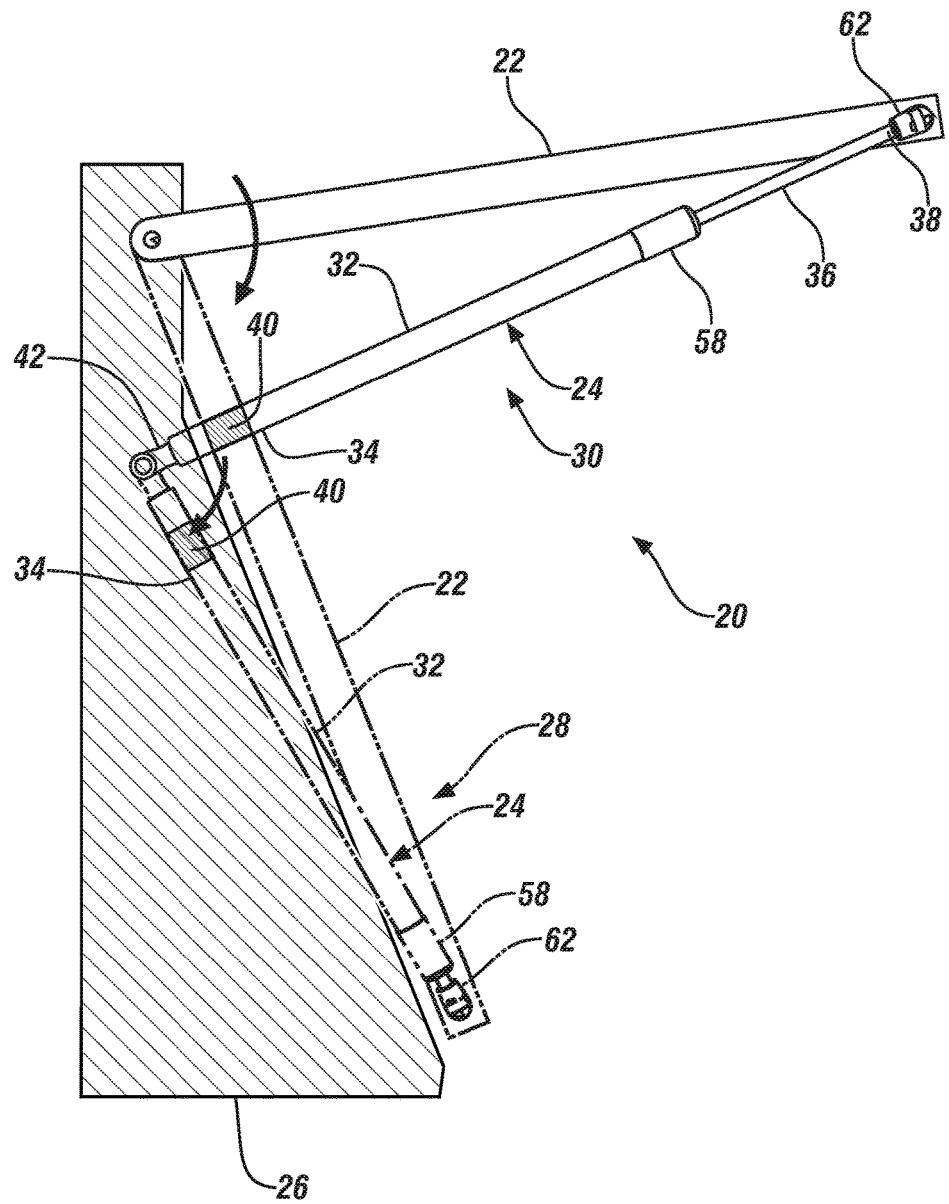
FIG. 1 is a schematic view of a gas strut assembly and a vehicle liftgate according to an embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 illustrates a gas strut assembly 20 that may be applied to a vehicle, and more specifically, to a vehicle liftgate 22. In this example, a gas strut 24 of the gas strut assembly 20 may extend between and may be pivotally engaged to the liftgate 22 and a vehicle frame 26. The gas strut 24 facilitates the lifting, and thus opening, of the liftgate 22 as the gas strut 24 pivotally moves from a retracted position 28 (i.e., illustrated in phantom) to an extended position 30. In this and/or other applications, the gas strut 24 may be a gas spring, a gas damper, a shock absorber, and other similar embodiments.

Figure 2:
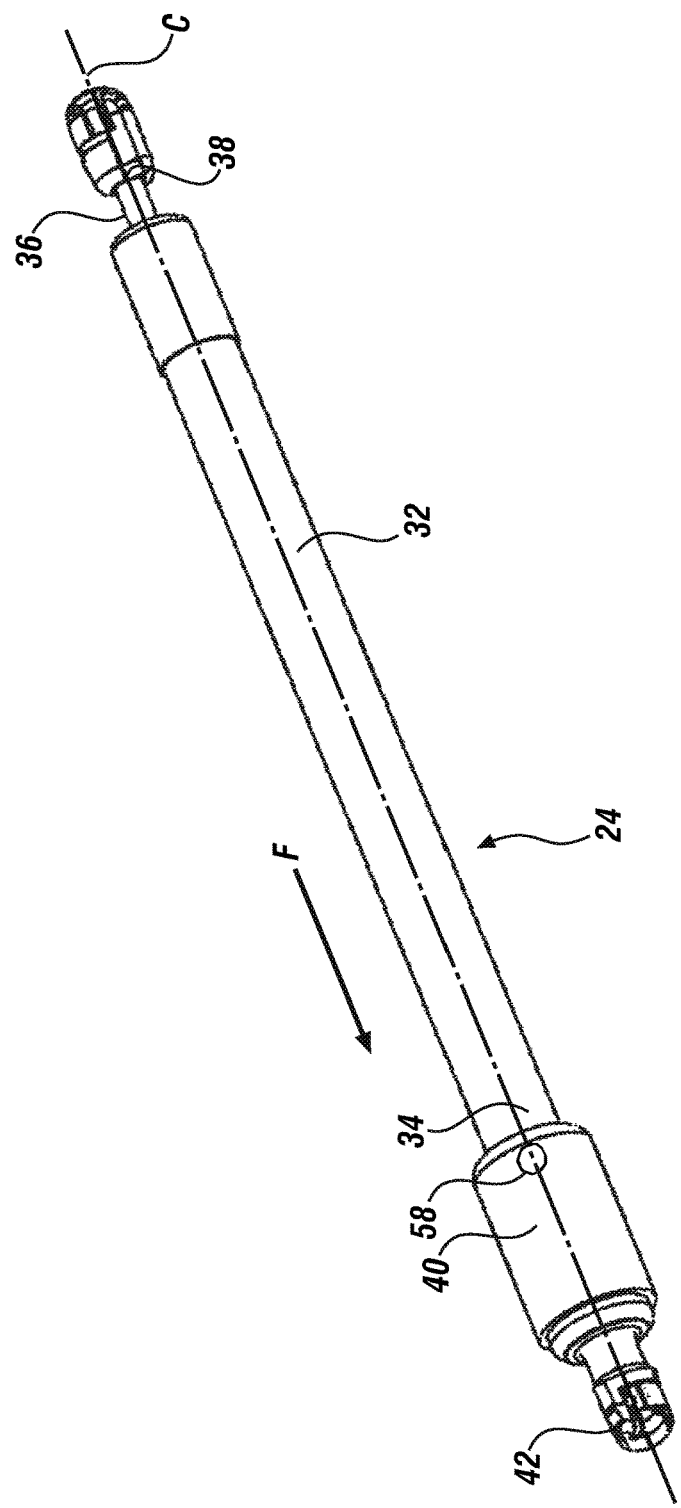
FIG. 2 is a perspective view of a gas strut assembly with a spring-assist gas strut monitor system according to an embodiment.

Referring to FIG. 2, the gas strut 24 may include a housing 32 that may be a cylinder. The piston assembly (internal to gas strut 24 and thus not shown) reciprocates along a centerline (C) within the housing 32. The housing 32 includes cylindrical inner surface (not shown) that faces radially inward and may be cylindrical, which seals against a reciprocating piston seal (not shown) to allow the gasses to perform the work of the piston. Although the inner working portions of the gas strut 24 are generally referred to herein, those skilled in the art appreciate the general functionality and dampening ability of a gas strut, and as such, some details are omitted for the sake of brevity.

Referring to FIGS. 1 and 2, a piston rod 36 is attached to the reciprocating piston (not shown) internal to housing 32, which is configured to be the extending portion that reciprocates along an axial length of gas strut 24. In operation, the piston and reciprocating piston slide upon the inner surface of the housing 32, and a gas controllably flows through openings in the piston head from one side of the piston head to the other, as the piston assembly (and piston rod 36) reciprocates between the retracted and extended positions 28, 30 (see FIG. 1). The resistant forces of the compressed gas flowing through the piston exerts the working force F on piston rod 36 and housing 32, respectively, depending on the direction of movement of piston rod 36.

The piston rod 36 includes a first end (internal to housing 32 and not shown attached to the internal piston), and an opposite second end 38 that is pivotally engaged to the liftgate 22. The housing 32 further includes a sealed base end 34 of the housing 32 that attaches to a gas strut spring assist wear monitor 40. The wear monitor 40 attaches to a strut end 42 that may be pivotally engaged to the vehicle frame 26.

In operation, the piston rod 36 transfers working force to the end 38 of piston rod 36, and to the vehicle frame 26 through the base end 34. That force transfers to the wear monitor 40 and strut end 42, respectively. That is to say, in operation the base end 34 of the housing 32 acts on the wear monitor 40, which then acts on the strut end 42 that may be pivotally attached to the vehicle frame 26. According to embodiments, the wear monitor 40 may be configured to detect wear or failure of the gas strut 24 and output an indication of a need for gas strut maintenance or replacement via a switch output device 58.

Figures 3, 4:
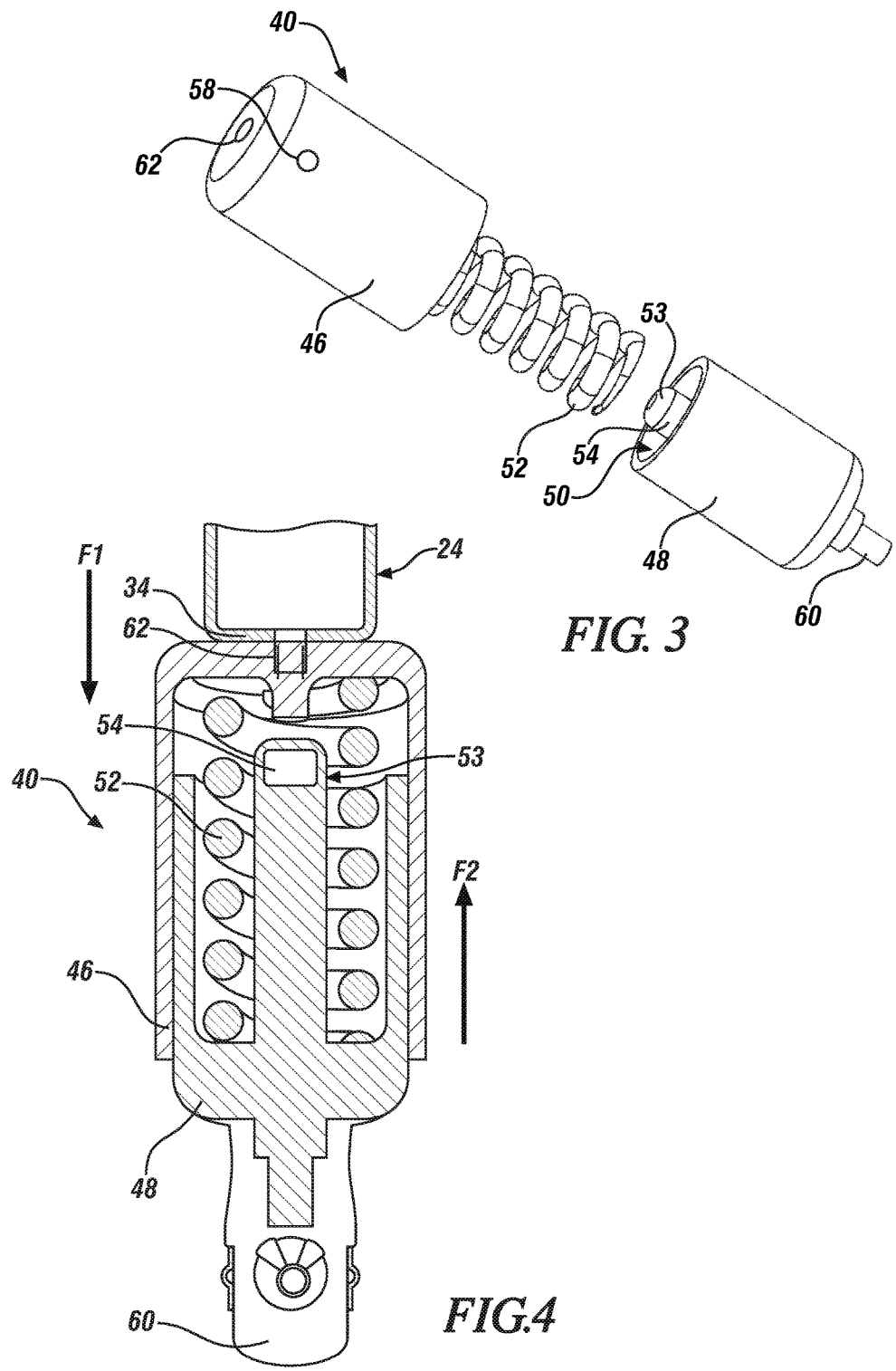
FIG. 3 is a disassembled perspective view of a spring assist gas strut wear monitor according to an embodiment.
FIG. 4 is a section view of the spring assist gas strut wear monitor of FIG. 3 installed on a gas strut assembly according to an embodiment.

FIG. 3 is a disassembled view of the wear monitor 40 according to an embodiment. FIG. 4 is an assembled section view of the wear monitor of FIG. 3 installed on a gas strut 24, according to an embodiment. Now, considering both FIGS. 3 and 4, wear monitor 40 includes outer housing 46, an inner housing 48, and a biasing member such as spring 52 disposed around a switch actuation post 53 disposed within a spring pocket 50. In operation, as force (shown in FIG. 4 as force vector F1) is applied to the wear monitor 40 by the gas strut 24, the spring 52 applies an opposite force (shown as force vector F2). The spring 52 is linearly correlated to output force F2. When the gas strut 24 is operating within acceptable limits (that is, force F1 from the gas strut 24 is sufficient to perform the work for which it is designed), force F1 from the gas strut 24 exceeds the force F2 exerted from the spring 52. Stated in different terms, the outer switch housing 46 will remain proximate to the inner switch housing 48 by compressing the spring 52. In operation, the spring 52 remains compressed indefinitely, until a significant portion of pressure is lost from the gas strut 24, and the output force of the base end 34 of the gas strut 24 is less than the output force of the spring 52. If the gas strut 24 has lost a significant portion of its operational pressure (creating force vector F1), then the spring 52 will be stronger than the gas strut 24, which will force the outer housing away from the inner housing 48. The separation of the housings 46 and 48 triggers the output of a signal indicating the need for maintenance or replacement of the gas strut 24.

According to embodiments of the present disclosure, the wear monitor 40 is independent of the gas strut 24 in that the wear monitor 40 may be replaced and/or the gas strut 24 may be replaced within the gas strut assembly 20 independently. Wear monitor 40 may be constructed of any suitable materials including, for example, steel, aluminum, injection molded plastic, machined metal, cast metal, etc.

In some aspects, the wear monitor 40 attaches to the base end 34 of the gas strut 24 via connecting portion 62, which may be, for example, a threaded opening, a press-fit opening, or other attaching means. The wear monitor 40 includes a connecting portion 60 that can engage and attach to the strut end 42, as shown in FIG. 4. Connecting portion 62 may be configured with any connecting means such as, for example, a threaded post, press-fit, retaining ring, etc.

According to one embodiment, the wear monitor 40 includes a switch 54 configured on the switch actuation post 53. When the switch 54 is no longer proximate to the outer switch housing 46, the switch 54 is configured to trigger an output on a switch output device. In one embodiment, the switch 54 is configured to attach to the switch actuation post 53, using any applicable attachment means (screw, adhesive, epoxy, etc.). Accordingly, the switch 54 is an integral part of the inner switch housing 48. In other aspects, the switch 54 may be configured to attach to the outer switch housing 46, and thus, the switch 54 would be an integral part of the outer housing. It should be appreciated that the location of the sensing mechanism with respect to one or the other of the inner and outer housing is trivial and not intended to be limiting.

In some aspects, the switch 54 may be configured to trigger the output an audio and/or visual response via switch output device 58. For example, in one embodiment, switch output device 58 is a light, and the switch 54 is configured to trigger an output response that causes the light 58 to flash or illuminate continuously.

In another embodiment, the switch output device 58 is an audio output device (speaker, chirp, etc.), and the switch 54 is configured to trigger an output response that causes the speaker to sound an alarm that is audible by a user.

In another embodiment, the switch output device 58 is a wireless communication device configured to output a message receivable by a body control module (not shown) of the vehicle. Accordingly, the switch output device 58 includes wireless transmission means for sending a predetermined message to a the control module, which may then output the predetermined message indicative of a need for gas strut maintenance or replacement.

In another embodiment, the switch output device 58 is configured for both audio and visual output. Accordingly, switch 54 is configured to trigger an output response via the switch output device 58 that causes the speaker to sound an alarm that is audible by a user, and illuminate a light that is viewable by the user.

Figure 5:
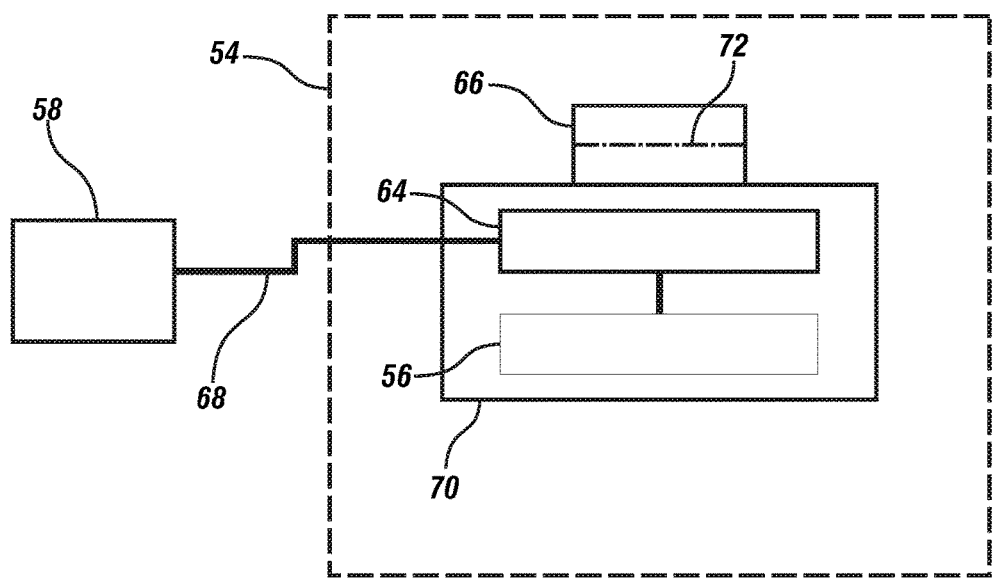
FIG. 5 is a schematic view of a switch and switch output device, according to an embodiment.

FIG. 5 depicts the switch 54 in communication with the output device 58 via a switch channel 68, according to one embodiment. In some aspects, the switch 54 includes a switch body 70 that is attachable to either the outer switch housing 46 or the inner switch housing 48. The switch body 70 houses a power cell 56 and a trigger mechanism 64. The trigger mechanism 64 may be any switch mechanism known in the art, including electronic or mechanical switching means, where a signal is transmit to the output device when the actuation mechanism is triggered.

In some embodiments, the triggering occurs when the triggering mechanism is moved from a depressed state 72 to an un-depressed state. For example, the actuation mechanism 66 may be in a depressed state when the gas strut 24 is operating within normal operational parameters, and the output force of the gas strut 24 is greater than the output force of the spring 52. But when the spring's output force overcomes the output force of the gas strut 24, the spring 52 separates the outer switch housing and the inner switch housing, which allows the actuation mechanism 66 to extend to the un-depressed state 72 (triggering output of a signal).

The trigger mechanism 64 may also include one or more microprocessors and/or solid state devices configured to output a continuous or intermittent signal responsive to being triggered.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A gas strut monitoring system comprising:
   a gas strut; and
   a gas strut wear monitor connected to a base end of the gas strut and a strut end, wherein the gas strut wear monitor is removable from the gas strut such that the gas strut is replaceable without replacing the gas strut wear monitor;
   wherein the gas strut wear monitor is configured to monitor an output force of the gas strut, and output a signal indicative of a maintenance recommendation for the gas strut based on the output force.

2. The system of claim 1, wherein the gas strut wear monitor comprises:
   an outer housing in communication with the gas strut;
   an inner housing in communication with the strut end;
   a spring in communication with the outer housing and the inner housing;
   a switch configured to determine a proximity of the outer housing with respect to the inner housing;
   and a switch output device in communication with the switch.

3. The system of claim 2, wherein the gas strut wear monitor is configured to output a signal when the spring forces the outer housing away from the inner housing.

4. The system of claim 2, wherein the switch comprises a switch body, a power cell, a trigger mechanism in communication with the power cell, and an actuation mechanism in communication with the trigger mechanism.

5. The system of claim 4, wherein the switch is configured to determine the proximity of the outer housing with respect to the inner housing, and output a signal using only the power cell as an independent power source when the outer housing is not proximate to the inner housing.

6. The system of claim 5, wherein the signal is indicative of the maintenance recommendation based on the output force of the gas strut.

7. The system of claim 2, wherein an output force of the spring is linearly correlated to the output force of the gas strut such that the output force of the gas strut is greater than the output force of the spring by a predetermined margin of force.

8. The system of claim 7, wherein an output force of the gas strut that is less than the predetermined margin of force is indicative that the gas strut is operating outside of normal operational parameters.

9. The system of claim 1, wherein the signal is an audible noise output.

10. The system of claim 1, wherein the signal is a visual light output.

11. A gas strut wear monitor connectable to a base end of a gas strut and a strut end, wherein the gas strut wear monitor is configured to:
    monitor a force output indicative of an operative performance of the gas strut without receiving power from a source external to the gas strut wear monitor; and
    output a signal based on a predetermined minimum output force the gas strut.

12. The gas strut wear monitor of claim 11, comprising:
    an outer housing configured to receive a force output from the base end of a gas strut;
    an inner housing configured to receive the force output from the gas base end of the gas strut, and communicate the a force output from the base end of a gas strut to a strut end via a spring in communication with the outer housing and the inner housing;
    a switch integrated with one of the outer housing and the inner housing, the switch configured to determine a proximity of the outer housing with respect to the inner housing; and
    a switch output device in communication with the switch, the output device configured to output a signal when the output force from the base end of the gas strut is less than an output force of the spring.

13. The gas strut wear monitor of claim 12, wherein the gas strut wear monitor is configured to output a signal when the spring forces the outer housing away from the inner housing.

14. The gas strut wear monitor of claim 13, wherein the switch comprises a switch body, a power cell, a trigger mechanism in communication with the power cell, and an actuation mechanism in communication with the trigger mechanism.

15. The gas strut wear monitor of claim 14, wherein the switch is configured to determine the proximity of the outer housing with respect to the inner housing, and output a signal using only the power cell as an independent power source when the outer housing is not proximate to the inner housing.

16. The gas strut wear monitor of claim 15, wherein the signal is indicative of a maintenance recommendation based on the operative performance of the gas strut.

17. The gas strut wear monitor of claim 13, wherein an output force of the spring is linearly correlated to an output force of the gas strut such that the output force of the gas strut is greater than the output force of the spring.

18. The gas strut wear monitor of claim 17, wherein an output force of the gas strut that is less than output force of the spring is indicative that the gas strut is operating outside of normal operational parameters.

19. The gas strut wear monitor of claim 11, wherein the signal is an audible noise output.

20. The gas strut wear monitor of claim 11, wherein the signal is a visual noise output.

* * * * *